United States Patent
Yang

(10) Patent No.: US 9,329,620 B2
(45) Date of Patent: May 3, 2016

(54) CIRCUIT FOR GENERATING PERIPHERAL CLOCK FOR USB AND METHOD THEREFOR

(71) Applicant: IPGoal Microelectronics (Sichuan) Co., Ltd., Chengdu, Sichuan (CN)

(72) Inventor: Xiu Yang, Sichuan (CN)

(73) Assignee: IPGoal Microelectronics (Sichuan) Co., Ltd., Chengdu, Sichuan Province (CN)

( * ) Notice: Subject to any disclaimer, the term of this patent is extended or adjusted under 35 U.S.C. 154(b) by 209 days.

(21) Appl. No.: 14/082,137

(22) Filed: Nov. 16, 2013

(65) Prior Publication Data

US 2014/0143584 A1    May 22, 2014

(30) Foreign Application Priority Data

Nov. 19, 2012 (CN) .......................... 2012 1 0466680

(51) Int. Cl.
*G06F 1/00* (2006.01)
*G06F 1/04* (2006.01)

(52) U.S. Cl.
CPC ...................................... *G06F 1/04* (2013.01)

(58) Field of Classification Search
CPC ................ G06F 1/04; G06F 1/06; G06F 1/08
See application file for complete search history.

(56) References Cited

U.S. PATENT DOCUMENTS

| | | | |
|---|---|---|---|
| 8,775,856 B1 * | 7/2014 | An ............................. | G06F 1/06 713/400 |
| 2007/0127405 A1 * | 6/2007 | Metcalf ................. | H04J 3/0661 370/315 |

* cited by examiner

*Primary Examiner* — Jaweed A Abbaszadeh
*Assistant Examiner* — Austin Hicks

(57) ABSTRACT

A circuit for generating a peripheral clock for USB, provided on a USB major structure, comprises an internal oscillator, a receiver, a transmitter, a clock counter, and a clock processor; wherein the internal oscillator generates a clock having a settled frequency; the receiver is connected with the internal oscillator and a system unit, and receives a packet transmitted by the system unit; the transmitter is connected with the internal oscillator and the system unit, and transmits a packet of the USB major structure to the system unit; the clock counter is connected with the receiver and the internal oscillator, and counts a length of the packet received; and the clock processor is connected with the clock counter, the internal oscillator, and the transmitter, and controls and adjusts a length of the packet transmitted by the transmitter according to the length of the packet counted by the clock counter.

16 Claims, 2 Drawing Sheets

CIRCUIT FOR GENERATING PERIPHERAL CLOCK FOR USB AND METHOD THEREFOR

CROSS REFERENCE TO RELATED APPLICATION

The present invention claims priority under 35 U.S.C. 119 (a-d) to CN 201210466680.7, filed Nov. 19, 2012.

BACKGROUND OF THE PRESENT INVENTION

1. Field of Invention

The present invention relates to a field of USB communication, and more particularly to a circuit for generating a peripheral clock for USB and a method therefor.

2. Description of Related Arts

USB is an abbreviation of Universal Serial BUS. USB has advantages of high speed, simple port, convenient application, etc. Thus, nowadays, USB is one of necessary standard ports of electronic equipments, such as PC (Personal Computer), MP4 (Mobile Pentium 4), mobile phone, PDA (Personal Digital Assistant), digital camera, printer, and scanner, and the USB is widely applied in aspects of info-communication and data transmission.

A conventional communicating system usually requires an accurate clock source. Based on the clock source, a master clock necessary for the communicating system is generated in the communicating system by logic, such as frequency division and frequency multiplication. The master clock is for analyzing and collecting data, and thus data communication is achieved. USB communicating system is no exception. Full speed communication has a communicating speed of 12 MHz and low speed communication has a communicating speed of 1.5 MHz, wherein USB communicating system requires a high accuracy of master clock for transmitting data, i.e., ±2.5% o. Therefore, USB communicating system usually adopts a clock solution of peripheral crystal oscillator, i.e., the peripheral crystal oscillator generates an accurate clock, for example 12 MHz, to be input in a chip. The chip generates a working clock of 300 MHz by logic module for frequency multiplication, such as PLL, wherein the working clock of 300 MHz is required by the USB communicating system at a low speed or a full speed, in order to guarantee communicating accuracy of USB major structure.

Because the crystal oscillator is required to provide the accurate clock for the USB major structure, the chip of USB communicating system should provide two extra pins for the crystal oscillator. Thus, USB communicating system is not applicable for electronic products which have few pins. Conventional electronic products, such as subscriber identity module, usually have 4~7 pins for other system functions, and there is no extra pins for the crystal oscillator. Therefore, the USB communicating system is not applicable for these electronic products.

In addition, with development of craftsmanship and design technique, volume of the electronic products become smaller and smaller, and a number of pins of electronic products is reduced. Volume of crystal oscillator is relatively big for SOC (System on Chip), which restricts highly integration and miniaturization of the electronic products. Therefore, the crystal oscillator becomes a critical factor to restrict application and development of the chip of USB communicating system.

The clock can also be generated by RC/LC oscillator in the chip of USB communicating system, and be input to the USB major structure. However, the clock generated by the RC/LC oscillator in the chip usually deviates from design objective by ±20%, because of process variations of RC/LC oscillator or other factors. Deviation will cause inconformity of lengths of packets in sending and receiving, which can not meet a demand of communicating accuracy of system.

Therefore, it is necessary to provide a circuit for generating a peripheral clock for USB and a method therefor, to overcome the above defects.

SUMMARY OF THE PRESENT INVENTION

An object of the present invention is to provide a circuit for generating a peripheral clock for USB and a method therefor. The present invention provides a master clock for USB major structure to work normally without occupying pins of the USB major structure. Low speed communication and full speed communication of the USB major structure having high accuracy can also be guaranteed.

To achieve the above object, the present invention provides a circuit for generating a peripheral clock for USB, provided on a USB major structure. The circuit for generating a peripheral clock for USB comprises an internal oscillator, a receiver, a transmitter, a clock counter, and a clock processor; wherein the internal oscillator generates a clock having a settled frequency; the receiver is connected with the internal oscillator and a system unit of a computer, the receiver receives a packet transmitted by the system unit of the computer according to the clock output by the internal oscillator; the transmitter is respectively connected with the internal oscillator and the system unit of the computer, the transmitter transmits a packet of the USB major structure to the system unit of the computer under controlling of the clock generated by the internal oscillator; the clock counter is respectively connected with the receiver and the internal oscillator, the clock counter counts length of the packet received by the receiver according the clock generated by the internal oscillator; the clock processor is respectively connected with the clock counter, the internal oscillator, and the transmitter; and the clock processor controls and adjusts length of the packet transmitted by the transmitter to be equal to the length of the packet received by the receiver according to the length of the packet counted by the clock counter.

Preferably, the internal oscillator is a RC oscillator or an LC oscillator.

Preferably, the clock generated by the internal oscillator is a high frequency clock.

Preferably, the clock output by the internal oscillator has a frequency of 300 MHz.

Accordingly, the present invention provides a method for generating a peripheral clock for USB. The method comprises: generating a clock having a settled frequency by an internal oscillator; according to the clock output by the internal oscillator, receiving a packet transmitted by a system unit of a computer by a receiver; according to the clock generated by the internal oscillator, transmitting a packet of the USB major structure to the system unit of the computer by a transmitter; according the clock generated by the internal oscillator, counting a length of the packet received by the receiver by a clock counter; and according to the length of the packet counted by the clock counter, controlling and adjusting a length of the packet transmitted by the transmitter by a clock processor.

Compared with conventional technology, the present invention provides the circuit for generating a peripheral clock for USB and the method therefor. The clock processor is respectively connected with the clock counter, the internal oscillator, and the transmitter. The clock counter counts the length of the packet transmitted by the system unit of the computer, and transmits a counting result to the clock processor. The clock processor controls and adjusts the length of the packet transmitted by the transmitter to be equal to the length of the packet received by the receiver, according to the counting result, in such a manner that length of transmitting packet and length of receiving packet of the USB major structure are equal with each other. Therefore, under controlling of the clock generated, the USB major structure is able to transmit packets to the system unit of the computer or receive packets from the system unit of the computer at a low speed or a full speed accurately.

These and other objectives, features, and advantages of the present invention will become apparent from the following detailed description, the accompanying drawings, and the appended claims.

DETAILED DESCRIPTION OF THE PREFERRED EMBODIMENT

The present invention provides a circuit for generating a peripheral clock for USB and a method therefor. The present invention provides a master clock for USB major structure to work normally without occupying pins of the USB major structure. Low speed communication and full speed communication of the USB major structure having high accuracy can also be guaranteed.

Figure 1:
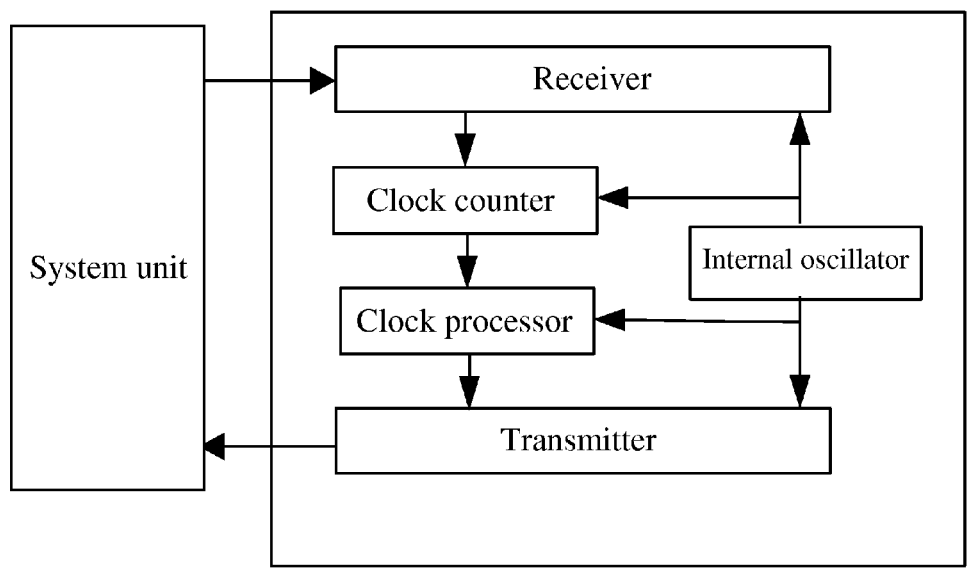
FIG. 1 is a sketch view showing connecting structure between a circuit for generating a peripheral clock for USB and a system unit of a computer.

Referring to FIG. 1, FIG. 1 is a sketch view showing connecting structure between a circuit for generating a peripheral clock for USB and a system unit of a computer. The present invention provides a circuit for generating a peripheral clock for USB, provided on a USB major structure. The circuit for generating the peripheral clock for USB comprises: an internal oscillator, a receiver, a transmitter, a clock counter, and a clock processor; wherein the internal oscillator generates a clock having a settled frequency, and respectively transmits the clock generated to the receiver, the transmitter, the clock counter, and the clock processor, to provide working clocks to the receiver, the transmitter, the clock counter, and the clock processor; the receiver is connected with the internal oscillator and a system unit of a computer; the receiver receives a packet transmitted by the system unit of the computer according to the clock output by the internal oscillator; the transmitter is respectively connected with the internal oscillator and the system unit of the computer; the transmitter transmits a packet of the USB major structure to the system unit of the computer under controlling of the clock generated by the internal oscillator; the clock counter is respectively connected with the receiver and the internal oscillator; the clock counter counts a length of the packet received by the receiver according to the clock generated by the internal oscillator; the clock processor is respectively connected with the clock counter, the internal oscillator, and the transmitter; the clock processor controls and adjusts a length of the packet transmitted by the transmitter to be equal to the length of the packet received by the receiver according to the length of the packet counted by the clock counter.

Specifically, in a first preferred embodiment of the present invention, the internal oscillator is an RC oscillator or an LC oscillator. The RC oscillator or the LC oscillator is able to generate the clock having a required frequency, and has a simple structure and a small volume, so the RC oscillator or the LC oscillator meets demand of integration and miniaturization of USB system products. The clock output by the RC oscillator or the LC oscillator is a high frequency clock, and the high frequency clock output by the RC oscillator or the LC oscillator has a frequency of 300 MHz. The clock generated by the RC oscillator or the LC oscillator has an error in frequency, which is ±20% at most, i.e., the clock output has a frequency of 240 MHz-360 MHz. The USB major structure is able to communicate at a low speed or a full speed with help of other components. Even if the error of the high frequency clock output by the RC oscillator or the LC oscillator is up to ±20% as mentioned before, low frequency data is still collected by the high frequency clock. The packet transmitted by the system unit of the computer is constant, so even if the error is up to 20%, the receiver is able to receive the packet normally. In addition, the frequency of the clock generated by the RC oscillator or the LC oscillator can be designed according to a communicating accuracy required. Usually, the higher the frequency of the clock is, the higher the communicating accuracy of the USB major structure is. The receiver is respectively connected with the RC oscillator or the LC oscillator and the system unit of the computer, and the RC oscillator or the LC oscillator provides a working clock to the receiver, which is necessary for the receiver to work normally. The receiver receives the packet transmitted by the system unit of the computer according to the clock output by the RC oscillator or the LC oscillator. The packet transmitted by the system unit of the computer usually comprises SOF (start-of-Frame), Setup, INToken, and OutToken. The transmitter is respectively connected with the RC oscillator or the LC oscillator and the system unit of the computer, and the transmitter transmits the packet of the USB major structure to the system unit of the computer under controlling of the clock generated by the RC oscillator or the LC oscillator. Because the clock output by the RC oscillator or the LC oscillator has the error in frequency, the length of the packet transmitted by the transmitter is different from the length of the packet received by the receiver, and it is necessary to adjust the length of the packet transmitted by the transmitter. The clock counter is respectively connected with the receiver, the clock processor, and the RC oscillator or the LC oscillator, and the clock counter counts the length of the packet received by the receiver according to the clock output by the RC oscillator or the LC oscillator, and transmits a counting result to the clock processor, in such a manner that the clock counter counts the length of the packet received by the receiver in real time. As described above, the length of the packet received by the receiver varies depending on the frequency of the clock output by the RC oscillator or the LC oscillator, and accordingly, the length of the packet transmitted by the transmitter varies depending on the frequency of the clock, and is hard to be equal to the length of the packet received. The clock processor is respectively connected with the RC oscillator or the LC oscillator and the transmitter, and the clock processor controls the length of the packet transmitted by the transmitter according to the length of the packet counted by the clock counter. Specifically, the clock processor controls the length of the packet transmitted by the transmitter to be equal to the length of the packet received by the receiver, according to the counting result of the clock counter, in such a manner that the length of the packet transmitted and the length of the packet received of the USB major structure are equal to each other, and the communicating accuracy of the USB major structure at the low speed or the full speed is increased.

In the circuit for generating the peripheral clock for USB as described above, the present invention adopts the high frequency clock to count the length of the packet transmitted by the system unit of the computer. The error between the frequency of the high frequency clock and a frequency of a target clock can be calculated according to a processing result of the clock processor, in such a manner that an accuracy of the transmitter, i.e., the length of the packet transmitted, is adjusted and amended to meet a demand of an accuracy for USB system to communicate at the low speed or the full speed.

Referring to FIG. 1, a second preferred embodiment of the present invention is described as follows.

In the second preferred embodiment the packet transmitted by the system unit of the computer is an SOF packet. The internal oscillator is an RC oscillator, which generates a clock of 300 MHz. When the USB system communicates in the full speed, a code rate of transmitting data by the system unit of the computer is 12 Mb at most. Therefore, the receiver is able to receive and identify the packet transmitted by the system unit of the computer with the high frequency clock of 300 MHz±20%. Once the receiver receives data of the SOF packet, the receiver informs the clock counter and transmits the data of the SOF packet to the clock counter. When the USB system communicates in the full speed, a length of the SOF packet is usually 32 Bits, wherein SYNC is included, and Bit stuff is not considered, and the code rate is 12 Mb. A length of a whole packet is counted with an accurate clock of 300 MHz, a counting result is 800 Cycle without regard to deviation. The clock counter transmits a counting result to the clock processor, and the clock processor controls the length of the packet transmitted by the transmitter according to processing result, wherein the clock processor retains some decimals to guarantee the accuracy. If the frequency of the clock generated by the RC oscillator is accurate, i.e., 300 MHz, the counting result of the clock counter is 800 Cycle, i.e., the transmitter transmits an SOF packet per 25 Cycle. If the frequency of the clock generated by the RC oscillator is not 300 MHz, i.e., the frequency of the clock has an error, which causes that the counting result of the clock counter is 799, the transmitter transmits an SOF packet per [24+31/32] Cycle, which is not an integer. Therefore, transmitting course of the packets should be adjusted. A group comprises 32 bits, wherein 31 bits in the group are transmitted at a speed of 25 Cycle per bit, and a last one bit is transmitted at a speed of 24 Cycle per bit, in such a manner that the transmitter transmits each packet per [24+31/32] Cycle averagely.

The above embodiment proves that the larger the counting result is, the higher the communicating accuracy of the USB system at the full speed or the low speed, after being adjusted by the circuit for generating the peripheral clock for USB in the present invention. As mentioned above, if the counting result is 800 Cycle, the communicating accuracy is ±1.25% o, which fully meets a demand of the USB major structure when communicating at the full speed or the low speed. In addition, if the error of the RC oscillator is up to ±20%, the counting result fluctuates between 800-20% and 800+20%. The worst counting result is 640, and the accuracy is ±1.5625% o at this time, which also meets the demand of the USB major structure when communicating. When the USB major structure communicates at the low speed, the code rate is only 1.5 Mb. Thus, the counting result is larger, and the accuracy at this time meets the demand of the USB major structure.

Figure 2:
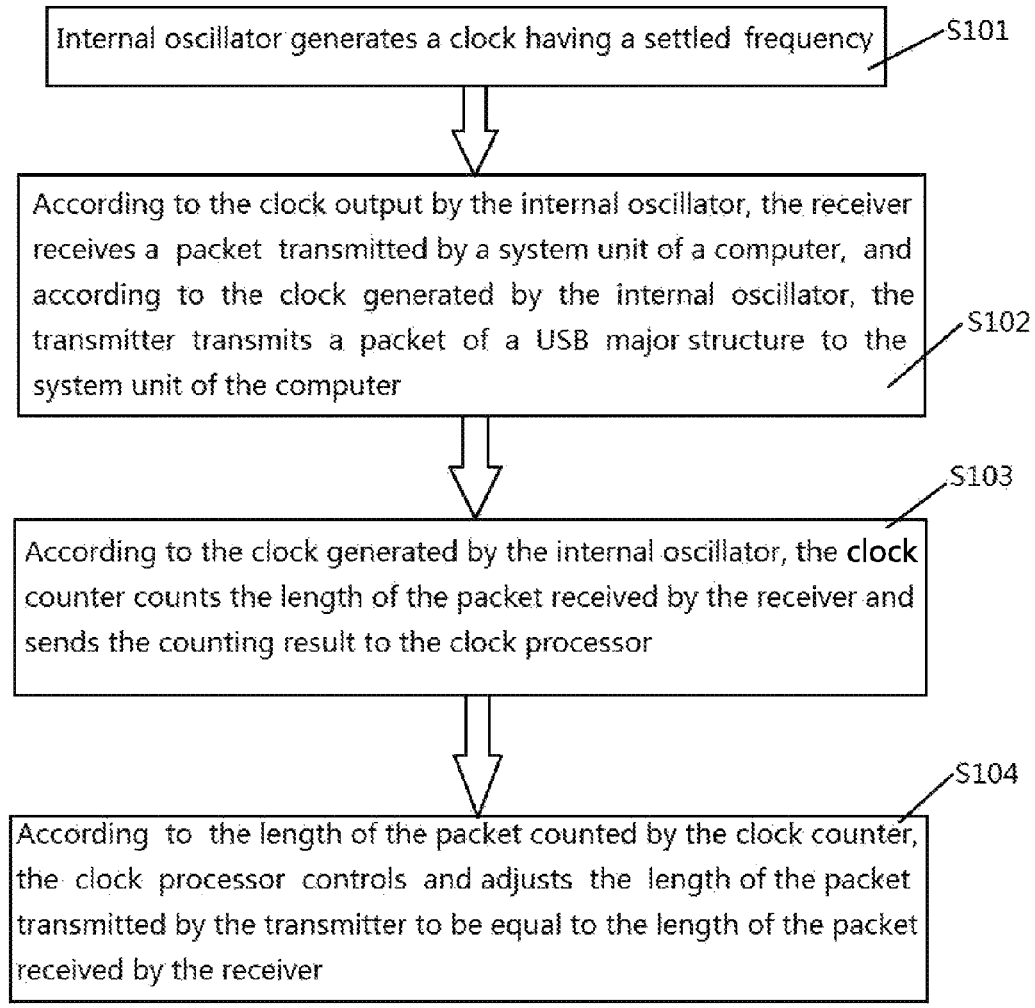
FIG. 2 is a flow chart showing a method for generating the peripheral clock for USB.

FIG. 2 shows a method for generating a peripheral clock for USB. Referring to FIG. 2, the method for generating the peripheral clock for USB comprises steps of:

(S101) generating a clock having a settled frequency by an internal oscillator; wherein the clock generated by the internal oscillator is a high frequency clock; a master clock is provided by subsequent steps for a USB major structure, in such a manner that the internal oscillator provides the master clock for the USB major structure, which is necessary for the USB major structure to communicate at a low speed or a full speed; thus, an crystal oscillator is not necessary to provide a clock required, which is beneficial to highly integration and miniaturization of USB system products; the high frequency clock generated by the internal oscillator has a frequency of 300 MHz, which not only guarantees that the USB major structure communicates normally at the low speed or the full speed, but also guarantees that a communicating accuracy meets a designed demand; in addition, the internal oscillator is an RC oscillator or an LC oscillator which has a simple structure and small volume and is beneficial to the highly integration and miniaturization of USB system products; the clock generated by the RC oscillator or the LC oscillator has an error which is up to ±20% at most; and even if the error is ±20%, the frequency of the clock is 240-360 MHz, and the USB major structure is able to communicate normally;

(S102) according to the clock output by the internal oscillator receiving a packet transmitted by a system unit of a computer by a receiver; and according to the clock generated by the internal oscillator, transmitting a packet of the USB major structure to the system unit of the computer by a transmitter; wherein the receiver and the transmitter receives and transmits the packets between the system unit of the computer and the USB major structure according to the high frequency clock generated by the RC oscillator or the LC oscillator, in such a manner that the USB major structure communicates with the system unit of the computer;

(S103) according to the clock generated by the internal oscillator, counting a length of the packet received by the receiver by a clock counter; wherein when the receiver starts to receive the packet transmitted by the system unit of the computer, the clock counter counts the length of the packet received by the receiver to obtain a counting result; and (S104) according to the length of the packet counted by the clock counter, controlling and adjusting a length of the packet transmitted by the transmitter by a clock processor; wherein the clock processor receives the counting result of the clock counter, and controls and adjusts the length of the packet transmitted by the transmitter according to the counting result, until the length of the packet transmitted by the transmitter is equal to the length of the packet received by the receiver.

In course described as above, while the USB major structure is communicating with the system unit of the computer, the frequency of the clock generated by the RC oscillator or the LC oscillator is not 300 MHz because of the error, which causes that the length of the packet transmitted by the transmitter is not equal to the length of the packet received by the receiver. But after processing of the clock counter and the clock processor, the length of the packet transmitted by the transmitter will be equal to the length of the packet received by the receiver, in such a manner that the lengths of the packets received and transmitted simultaneously by the USB major structure are equal. Therefore, the lengths of the packets received and transmitted by the USB major structure are controlled and adjusted to be equal to each other by the method for generating the peripheral clock for USB, in such a manner that the USB major structure is able to accurately transmit packets to or receive packets from the system unit of the computer at the low speed or the full speed under controlling of the clock generated.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A circuit for generating a peripheral clock for USB (Universal Serial Bus), provided on a USB major structure, comprising an internal oscillator, a receiver, a transmitter, a clock counter and a clock processor, wherein:
   the internal oscillator generates a clock having a settled frequency and respectively provides a working clock for the receiver, the transmitter, the clock counter and the clock processor;
   the receiver is connected with the internal oscillator and a system unit of a computer and receives a packet transmitted by the system unit of the computer according to the clock output by the internal oscillator;
   the transmitter is respectively connected with the internal oscillator and the system unit of the computer and transmits a packet of the USB major structure to the system unit of the computer under controlling of the clock generated by the internal oscillator;
   the clock counter is respectively connected with the receiver and the internal oscillator, counts a length of the packet received by the receiver according to the clock output by the internal oscillator and sends a counting result to a clock processor, such that the clock counter counts the length of the packet received by the receiver in real-time; and
   the clock processor is respectively connected with the clock counter, the internal oscillator, and the transmitter, controls and adjusts the length of the packet transmitted by the transmitter to be equal to the length of the packet received by the receiver according to the length of the packet counted by the clock counter, in such a manner that the length of the packet transmitted and the length of the packet received of the USB major structure are equal to each other for increasing a communicating accuracy of the USB major structure.

2. The circuit, as recited in claim 1, wherein the internal oscillator is an RC oscillator or an LC oscillator.

3. The circuit, as recited in claim 2, wherein the clock generated by the internal oscillator is a clock with a high frequency more than zero cycles per second.

4. The circuit, as recited in claim 3, wherein the clock generated by the internal oscillator has a frequency of 300 MHz.

5. The circuit, as recited in claim 4, wherein the packet transmitted by the system unit of the computer comprises SOF (start-of-Frame), Setup, INToken, and OutToken.

6. The circuit, as recited in claim 3, wherein the packet transmitted by the system unit of the computer comprises SOF (start-of-Frame), Setup, INToken, and OutToken.

7. The circuit, as recited in claim 2, wherein the packet transmitted by the system unit of the computer comprises SOF (start-of-Frame), Setup, INToken, and OutToken.

8. The circuit, as recited in claim 1, wherein the packet transmitted by the system unit of the computer comprises SOF (start-of-Frame), Setup, INToken, and OutToken.

9. A method for generating a peripheral clock for USB (Universal Serial Bus), comprising steps of:
   (1) an internal oscillator generating a clock having a settled frequency and providing a working clock for a USB major structure;
   (2) according to the clock output by the internal oscillator, a receiver receiving a packet transmitted by a system unit of a computer, and according to the clock generated by the internal oscillator, a transmitter transmitting a packet of the USB maj or structure to the system unit of the computer;
   (3) according the clock generated by the internal oscillator, a clock counter counting a length of the packet received by the receiver, and sending a counting result to a clock processor, such that the clock counter counts the length of the packet received by the receiver in real-time; and
   (4) according to the length of the packet counted by the clock counter, the clock processor controlling and adjusting the length of the packet transmitted by the transmitter to be equal to the length of the packet received by the receiver, in such a manner that the length of the packet transmitted and the length of the packet received of the USB major structure are equal to each other for increasing a communicating accuracy of the USB major structure.

10. The method, as recited in claim 9, wherein the internal oscillator is an RC oscillator or an LC oscillator.

11. The method, as recited in claim 10, wherein the clock is a clock with high frequency more than zero cycles per second.

12. The method, as recited in claim 11, wherein the clock generated by the internal oscillator has a frequency of 300 MHz.

13. The circuit, as recited in claim 12, wherein the packet transmitted by the system unit of the computer comprises SOF (start-of-Frame), Setup, INToken, and OutToken.

14. The circuit, as recited in claim 11, wherein the packet transmitted by the system unit of the computer comprises SOF (start-of-Frame), Setup, INToken, and OutToken.

15. The circuit, as recited in claim 10, wherein the packet transmitted by the system unit of the computer comprises SOF (start-of-Frame), Setup, INToken, and OutToken.

16. The method, as recited in claim 9, wherein the packet transmitted by the system unit of the computer comprises SOF (start-of-Frame), Setup, INToken, and OutToken.

* * * * *